March 7, 1950 W. D. BOYNTON 2,499,720
METHOD OF AND APPARATUS FOR TESTING INSULATION
Filed Nov. 30, 1945 8 Sheets-Sheet 1

INVENTOR
W.D. BOYNTON
BY [signature]
ATTORNEY

March 7, 1950

W. D. BOYNTON 2,499,720

METHOD OF AND APPARATUS FOR TESTING INSULATION

Filed Nov. 30, 1945

INVENTOR
W. D. BOYNTON

BY

ATTORNEY

March 7, 1950

W. D. BOYNTON 2,499,720

METHOD OF AND APPARATUS FOR TESTING INSULATION

Filed Nov. 30, 1945

INVENTOR
W. D. BOYNTON

BY

ATTORNEY

March 7, 1950

W. D. BOYNTON 2,499,720

METHOD OF AND APPARATUS FOR TESTING INSULATION

Filed Nov. 30, 1945

INVENTOR
W. D. BOYNTON

BY

ATTORNEY

March 7, 1950 W. D. BOYNTON 2,499,720
METHOD OF AND APPARATUS FOR TESTING INSULATION
Filed Nov. 30, 1945 8 Sheets-Sheet 6

INVENTOR
W. D. BOYNTON
BY
ATTORNEY

March 7, 1950     W. D. BOYNTON     2,499,720
METHOD OF AND APPARATUS FOR TESTING INSULATION
Filed Nov. 30, 1945     8 Sheets-Sheet 7

INVENTOR
W. D. BOYNTON
BY
ATTORNEY

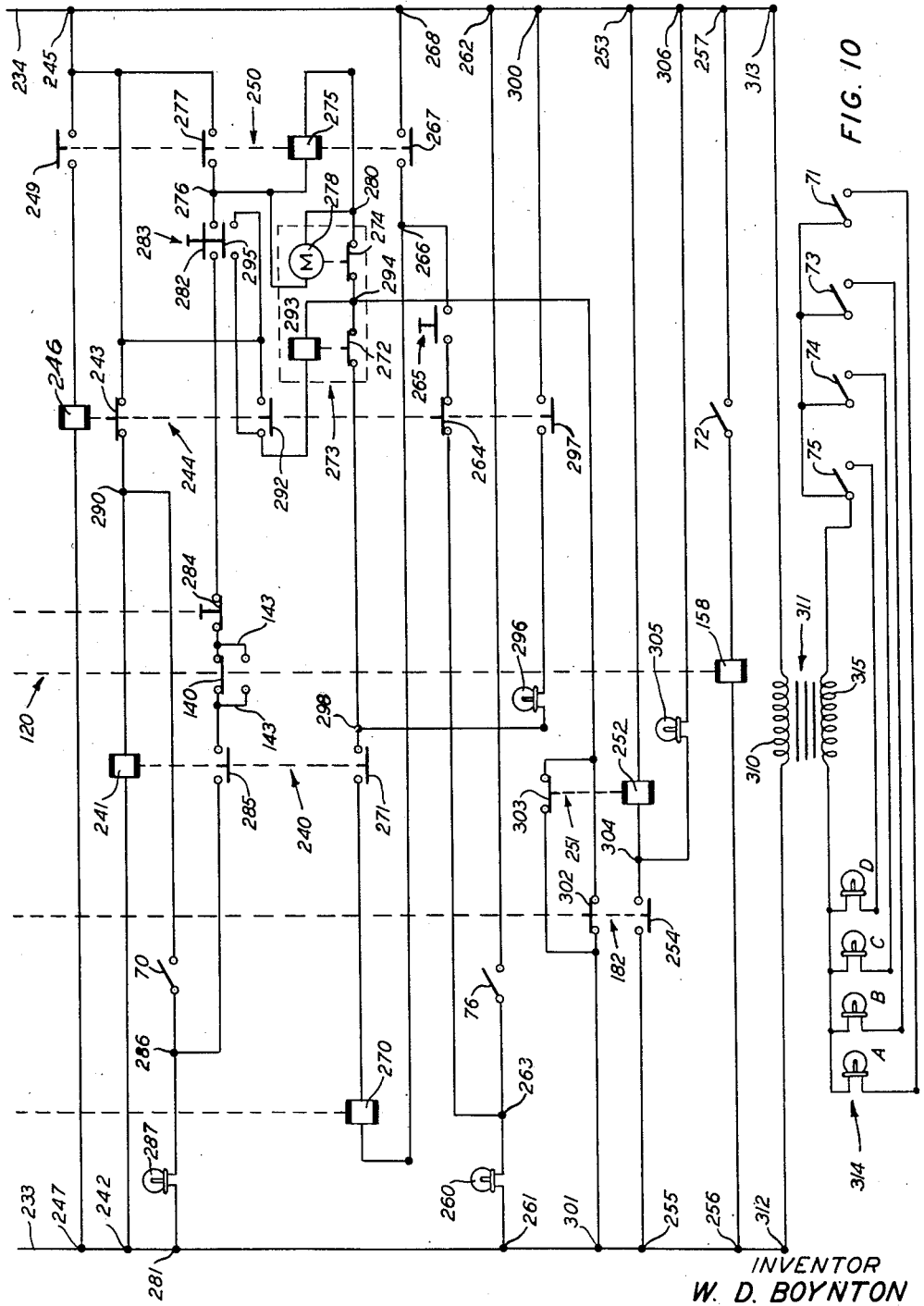

Patented Mar. 7, 1950

2,499,720

UNITED STATES PATENT OFFICE 2,499,720

METHOD OF AND APPARATUS FOR TESTING INSULATION

Wentworth D. Boynton, Woodbrook, Md., assignor to Western Electric Company, Incorporated, New York, N. Y., a corporation of New York Application November 30, 1945, Serial No. 632,042

11 Claims. (Cl. 219—11)

This invention relates to a method of and an apparatus for testing insulation and more particularly to a method of and an apparatus for testing the insulation of multi-conductor electric cables.

An object of the invention is to provide a new and improved method of and apparatus for testing insulation, and particularly to provide a new and improved method of and apparatus for testing the insulation of the individual conductors of multi-conductor cables.

A further object of the invention is to provide an improved method and apparatus by which one may efficiently, rapidly and simultaneously test the insulation on the conductors of a plurality of multi-conductor cables with a minimum of manual labor and attention.

Still another object of the invention is to provide means for isolating any defective conductors from the testing circuit in order that the high potential insulation test voltage may be applied to the remaining conductors of multi-conductor cables connected to the testing apparatus.

One apparatus for practicing a method embodying the invention comprises means for testing four-conductor cables in groups of twelve and for applying a high potential to one of the four conductors of each of the twelve cables at the same instant, while connecting the remaining conductors of each cable to ground. The high potential is first applied in a manner to locate which, if any, of the conductors have defective insulation, whereupon any defective conductors may be isolated from the testing apparatus. The remaining conductors are then switched over to the testing voltage, which is applied thereto for a predetermined period of time after which the apparatus is automatically deenergized. An operator, by a relatively simple manipulation of the testing apparatus, switches the tested conductors to the ground connection and connects the next group of twelve untested conductors to the "locate" voltage. After any defective conductors in this group have been located and have been isolated from the testing apparatus, the remaining conductors are switched over to the testing voltage as described above. This procedure is continued until all four conductors of each of the twelve cables have been subjected to the high potential test voltage for a predetermined period of time.

A complete understanding of the invention may be had from the following detailed description of an apparatus forming a specific embodiment thereof, when read in conjunction with the appended drawings, in which:

Fig. 6 is a fragmentary sectional view taken along line 6—6 of Fig. 4;

Fig. 10 is a schematic diagram of a control circuit employed to regulate the high potential circuit.

Figure 1:
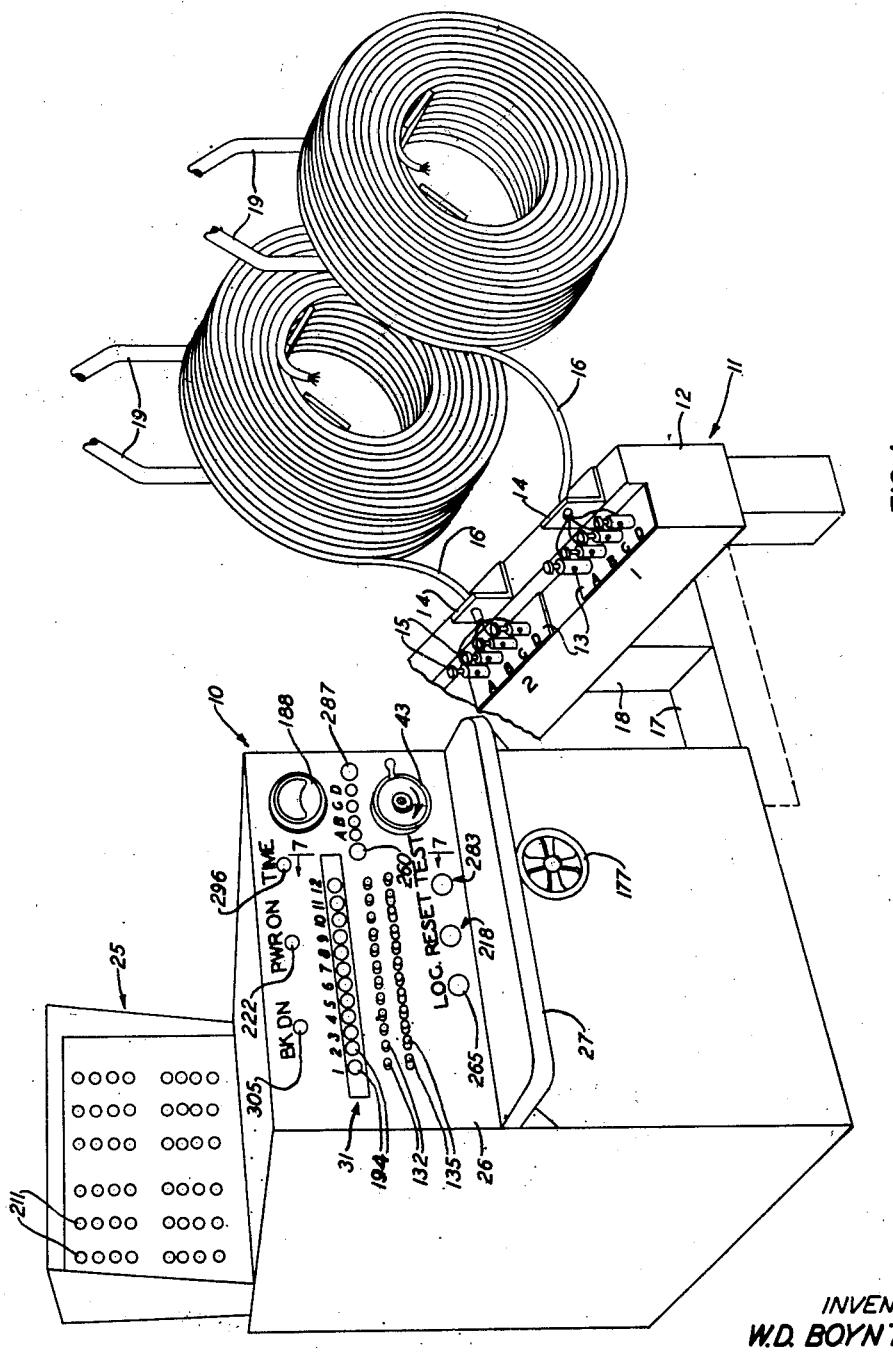
Fig. 1 is a perspective view of an apparatus for testing the insulation in multi-conductor cables showing a plurality of coils of the cables to be tested connected thereto.

Referring now in detail to the drawings, there is shown an insulation testing apparatus comprising a compact high potential testing unit 10 (Fig. 1) and a terminal bus 11. The terminal bus 11 includes an elongated conduit box 12, a plurality of insulated terminal stations 13—13 externally supported on a recessed portion of the top of the conduit box 12 and a plurality of grounding clips 14—14 secured on the top of the conduit box 12 adjacent to the terminal stations 13—13. The terminal stations 13—13 positioned on the conduit box 12 are numbered 1 to 12, inclusive, so that they may be identified with indicating means which will be described herein below. Each of the terminal stations 13—13 is provided with a plurality of contacting clips 15—15 marked "A," "B," "C" and "D," respectively, which clamp on the bare ends of the individual conductors of one of a plurality of four-conductor cables 16—16. A plurality of conductors (not shown) leading from the test unit 10 are carried in a horizontal, rectangular conduit 17 buried in the floor and in a vertical, rectangular conduit 18 to the conduit box 12 of the terminal bus 11. These conductors are connected to their respective high voltage contacting clips 15—15 mounted on the insulated terminal stations 13—13.

A plurality of coils of the four-conductor cables 16—16 are positioned adjacent to the terminal bus 11 and are supported by a plurality of hooks 18—18, which are movably mounted on an overhead trolley rail (not shown). The conductors in each of the cables 16—16 are stripped at one end and are inserted in their respective contacting clips 15—15.

In the particular embodiment of the invention illustrated, each of the cables 16—16 to be tested contains four individually insulated conductors. As is evident from Fig. 9, these cables comprise four conductors A, B, C and D and individual insulating coverings 20—20 formed thereover. The coverings 20—20 are made of a suitable vulcanized insulating compound containing rubber or a synthetic rubber-like material. The four insulated conductors are bound together by a tape 21, over which a steel wire braid 22 is formed to provide a shield. The whole assembly of conductors and steel wire braid is covered by a protective jacket 23 made of a vulcanized compound, which may contain rubber or a synthetic rubber-like material.

A continuity indicating lamp bank 25 (Figs. 1 and 9) is mounted on the top of the test unit 10 and facing the front thereof, wherein an indicating lamp is provided for each of the terminal clips 15—15 located at the insulated terminal stations 13—13 of the terminal bus 11.

The upper half of the front panel of the test unit 10 constitutes the switch board 26 of the test unit and has positioned thereon all the indicating and switching apparatus required to operate the test unit. An arm rest 27 is situated on the front panel directly below the switch board 26, whereupon the operator may rest his arms thereon while operating the various switches on the switchboard 26.

The test unit 10 comprises an angle iron frame 29—29 (Fig. 2) having upright central channel supports 30—30. The angle iron frame 29—29 is covered with a sheet steel housing provided with the necessary doors and removable panels whereby all the internal apparatus is enclosed but is readily accessible for maintenance and repair. The apparatus positioned within the test unit housing comprises a bank of fault indicating lamps 31, a bank of manually operated isolating switches 32, a conventional type of voltage regulator 33 known commercially as a "powerstat," a high voltage, multi-deck, rotary switching mechanism 34, a bank of conventional resistances 35, a conventional type of step-up transformer 40 and a control panel 41. The individual lamps of the indicating lamp bank 31 are numbered 1 to 12, inclusive, corresponding to the like numbered terminal stations 13—13 (Fig. 1). The voltage regulator 33, the step-up transformer 40, the resistor bank 35 and the control switches mounted on panel 41 are commercial items well known to the art, hence their construction and operation will not be described except as they appear in the wiring circuit described hereinbelow.

Figure 3:
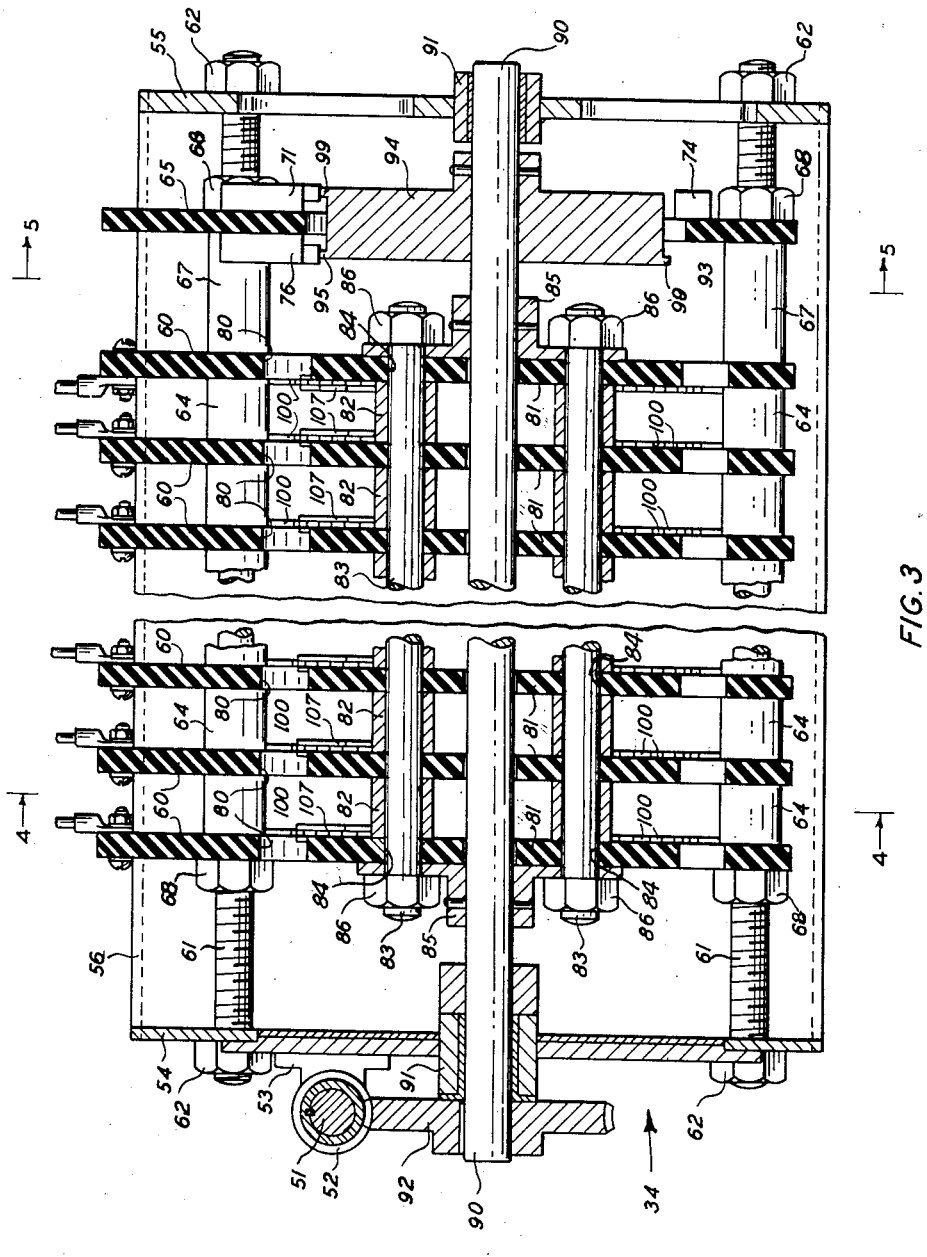
Fig. 3 is a vertical, sectional view of a multi-deck switching mechanism forming a part of the apparatus, the view being taken along line 3—3 of Fig. 2.

The rotary switching mechanism 34 is centrally positioned in the test unit 10 and is mounted on a framework 42, which is secured to the upright frame supports 30—30. The rotary switch mechanism 34 is operated by means of a hand wheel 43, which is rigidly secured to a shaft 44 rotatably positioned in a bearing 45 secured to an upright member 46. The shaft 44 extends through the bearing 45 and has attached adjacent thereto half of a flexible coupling 50. The other half of the flexible coupling 50 is attached to a shaft 51 on which is keyed a worm 52 (Fig. 3). The shaft 51 is rotatably mounted in a pair of bearings 53—53 rigidly secured to the rotary switch 34.

Figure 2:
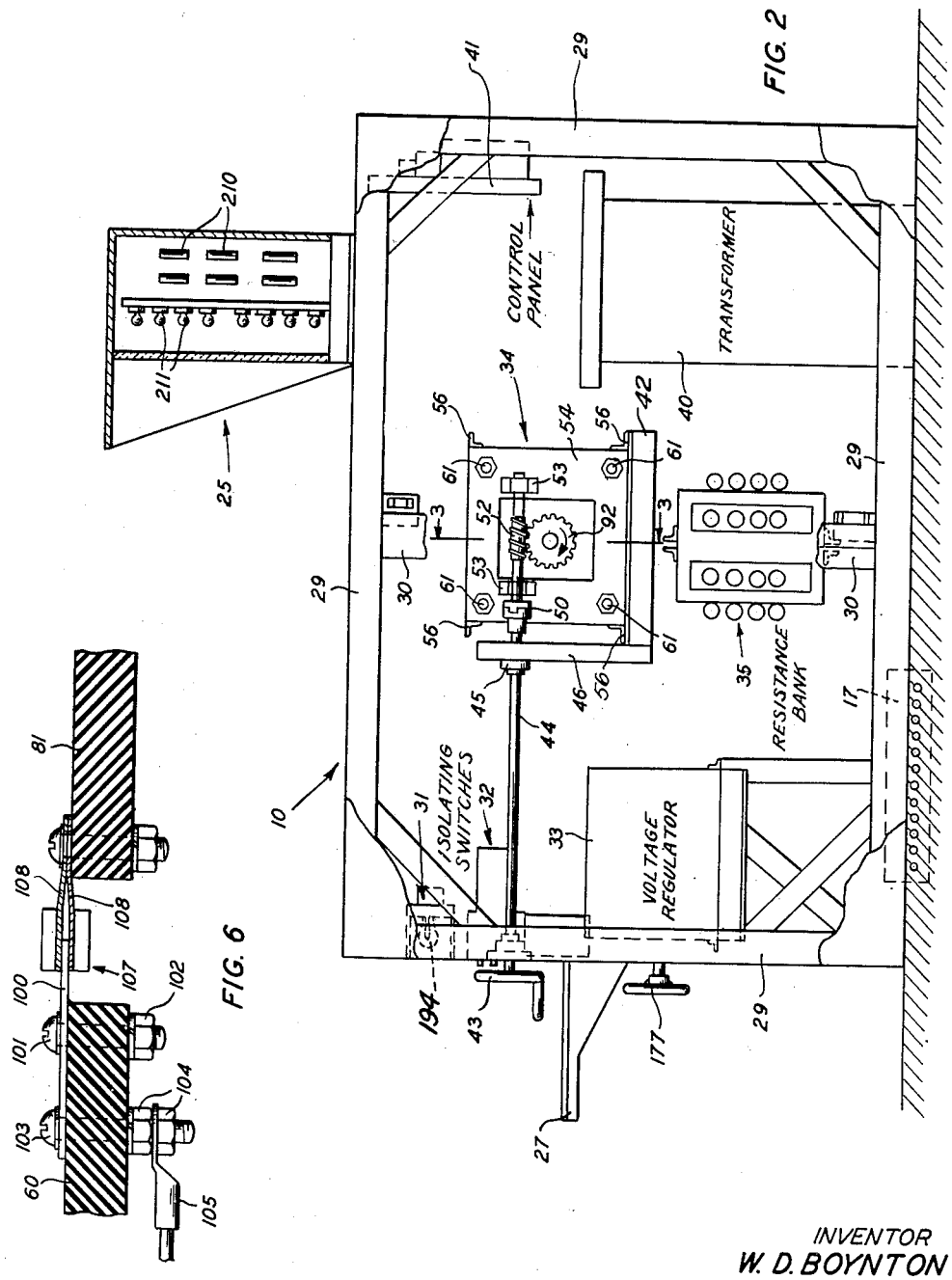
Fig. 2 is a longitudinal, vertical sectional view of the test set showing the general arrangement of the various elements of the apparatus enclosed therein.
Figure 4:
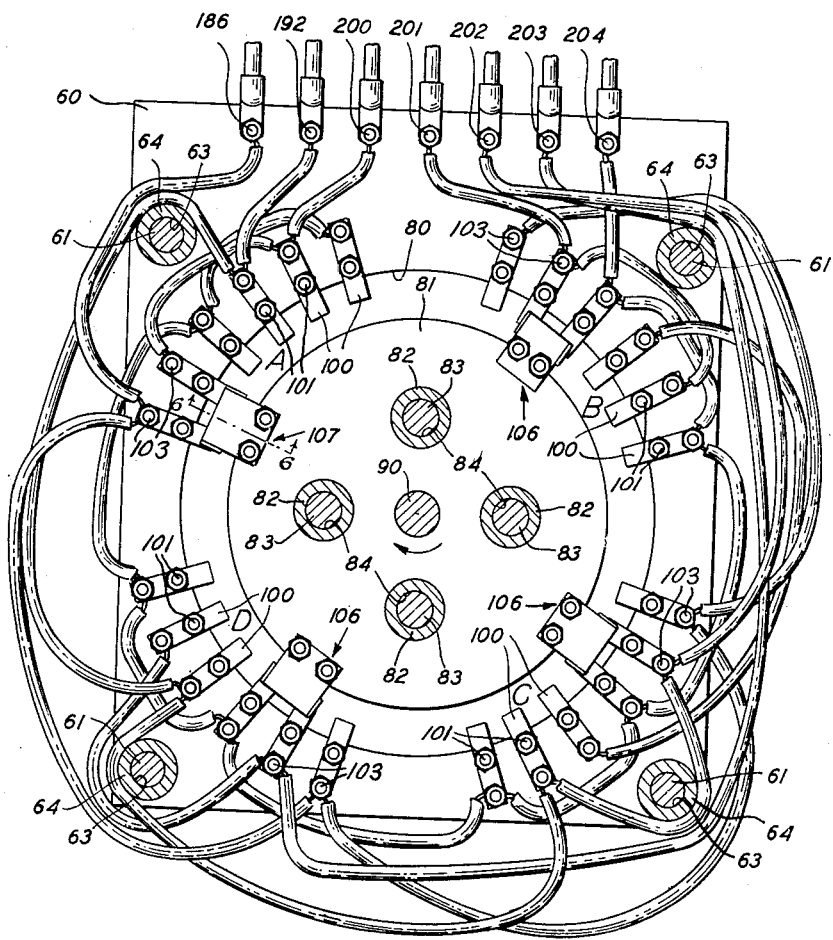
Fig. 4 is a vertical sectional view taken along line 4—4 of Fig. 3 showing one deck of the rotary switch.

The rotary switch mechanism 34 comprises a frame made up of end plates 54 and 55 which are rigidly spaced apart and held parallel to each other by means of a plurality of angles 56—56 secured at each of the four corners of end plates 54 and 55 as shown in Fig. 2. Spaced between the end plates 54 and 55 is a deck of rectangular, non-conductive, plates 60—60 (Figs. 3 and 4) supported by a plurality of elongated bars 61—61, which are secured substantially in each of the four corners of the end plates 54 and 55 (Fig. 2), by means of a plurality of nuts 62—62 and pass through apertures 63—63 provided in the plates 60—60 (Fig. 4). The plates 60—60 are equally spaced along the supporting bars 61—61 by means of a plurality of tubular spacers 64—64 alternately positioned on the supporting bars 61—61 between the plates 60—60. The number of deck plates 60—60 positioned in the switching assembly 34 corresponds to the number of cables 16—16 which are to be tested.

There is also provided in the rotary switch mechanism 34 a rectangular, non-conductive plate 65 (Fig. 5) positioned adjacent to the end plate 55 and supported by the bars 61—61, which pass through a plurality of apertures 66—66 provided adjacent to the corners thereof. A plurality of tubular spacers 67—67 are positioned on the bars 61—61 between the end plate 60 and the plate 65, whereby the deck of plates 60—60 and the plate 65 are clamped together as a unit between the nuts 68—68 threadedly mounted on the supporting bars 61—61. The plate 65 has mounted on its left hand face a plurality of microswitches 70, 72 and 76 and on its right hand face a plurality of microswitches 71, 73, 74 and 75 (Figs. 3 and 5).

The plates 60—60 are provided with bores 80—80 in which is centrally positioned a deck of non-conductive discs 81—81. A disc 81 is provided for each of the plates 60—60 and the discs 81—81 are rotatably mounted with respect to the plates 60—60. The rotatable discs 81—81 are vertically aligned with the plates 60—60 by means of a plurality of tubular spacers 82—82 and a plurality of tie rods 83—83, which pass through the spacers 82—82 and through a plurality of apertures 84—84 radially positioned in the rotatable discs 81—81 (Fig. 4). A pair of end members 85—85 are positioned on the tie rods 83—83 at the ends of the deck of rotatable discs 81—81, and are clamped in this position by means of a plurality of nuts 86—86. The deck of rotatable discs 81—81 is thereby rigidly secured to the end members 85—85 which in turn are pinned to a shaft 90. The shaft 90 is rotatably mounted in the end plates 54 and 55 by means of a pair of bearings 91—91 centrally secured therein. The extremity of the shaft 90 which extends beyond the end plate 54 has keyed thereon a worm gear 92 which meshes with the worm 52 keyed on the worm shaft 51.

The plate 65 is provided with a bore 93 in which is centrally positioned a cam 94 pinned to the shaft 90. Positioned on the left hand portion of the periphery of cam 94 as seen in Fig. 3, are a plurality of equally spaced lobes 95, 96, 97 and 98, which serve to successively engage the operating arms of the microswitches 70, 72 and 76 which are mounted on the left hand face of the plate 65. The lobes 95, 96, 97 and 98 are identical in size and shape and are so designed that they engage the microswitches 70, 72 and 76 only at a definite position of the cam 94 with respect to the plate 65. A very slight movement of the cam 94 in either direction deactuates the microswitches engaged by any one of the lobes 95, 96, 97 or 98. Positioned on the right hand portion of the periphery of the cam 94 is a relatively long lobe 99, which serves to successively engage the equally spaced microswitches 71, 73, 74 and 75 mounted on the right hand face of the plate 65. The lobe 99 is of such length that it will engage one of the microswitches 71, 73, 74 or 75 while one of the lobes 95, 96, 97 or 98 is moving from the microswitch 76 to the microswitch 70.

Figure 5:
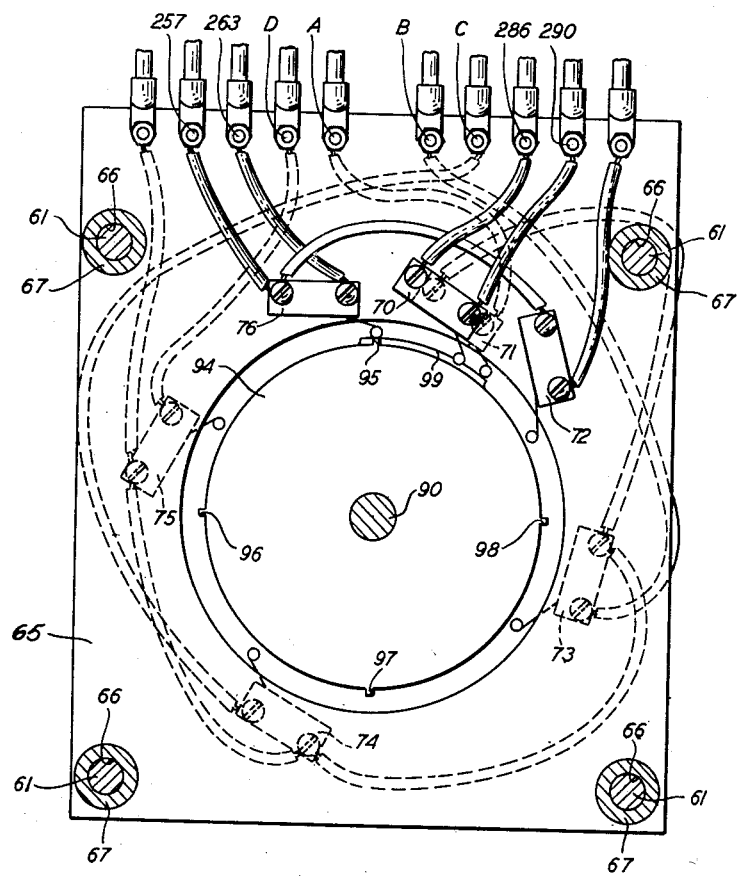
Fig. 5 is a vertical sectional view taken along line 5—5 of Fig. 3.

When the operating handle 43 is rotated in a clockwise direction, as seen in Fig. 1, the worm 52 drives the worm gear 92 which serves to revolve the shaft 90 thereby rotating the contact discs 81—81 and the cam 94 in a clockwise direction, as seen in Figs. 4 and 5.

Figure 9:
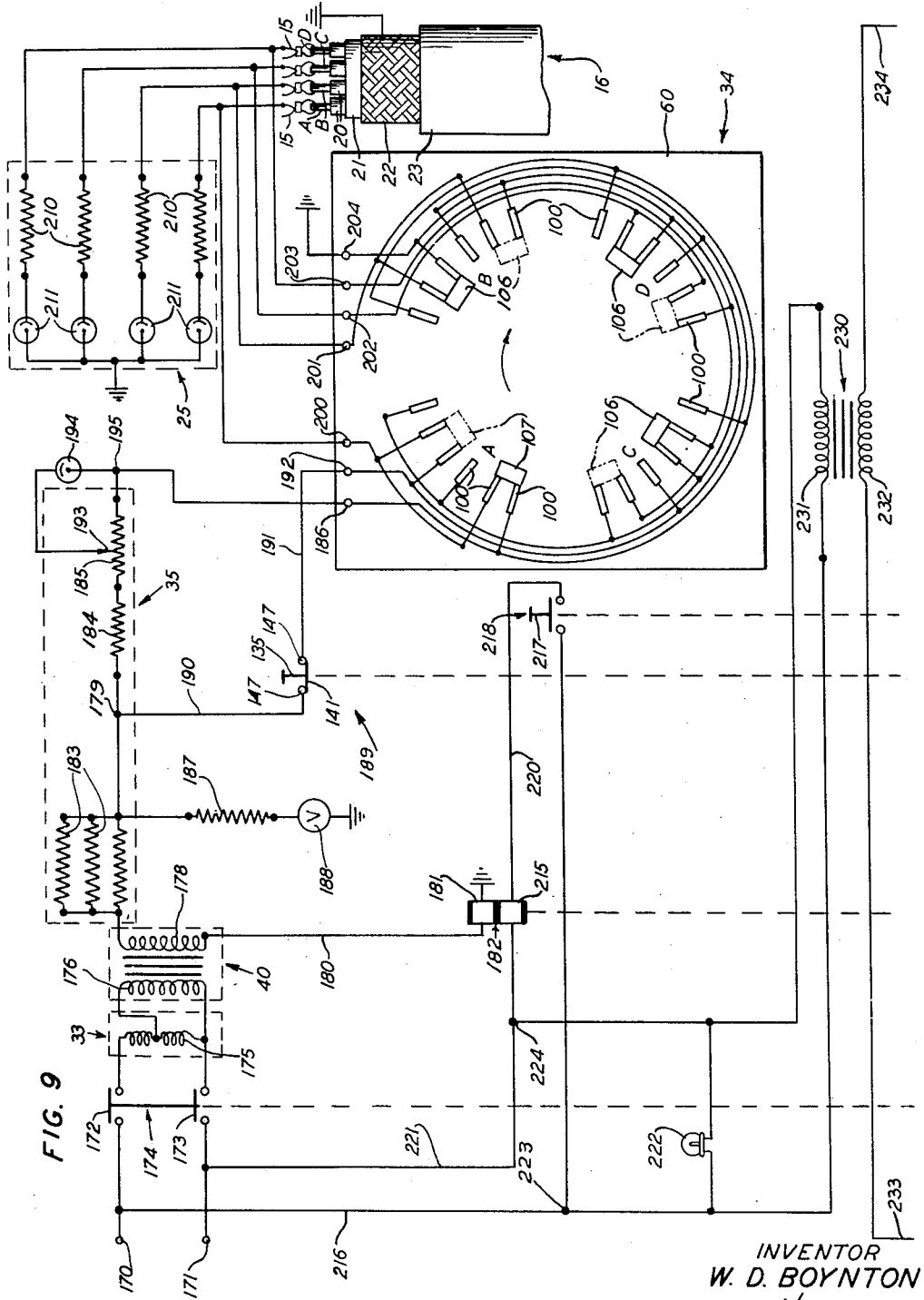
Fig. 9 is a schematic wiring diagram of a high potential circuit, forming a part of the apparatus

Each of the plates 60—60 has a plurality of rectangular contact fingers 100—100 radially positioned thereon adjacent to the bore 80 so that a portion of the contact fingers 100—100 extend beyond the edge of the bore 80. The contact fingers 100—100 are assembled on the plates 60—60 in groups of six in each of four equally spaced quadrants around the bore 80 with the six fingers of each group uniformly spaced from each other. For purposes of identification, these four quadrants of each of the plates 60—60 are designated "A," "B," "C" and "D," respectively, as shown in Figs. 4 and 9. The contact fingers 100—100 are secured to the plate 60 by means of an inner row of bolts 101—101 and nuts 102—102 threaded thereon, and an outer row of bolts 103—103 and nuts 104—104 threaded thereon. Each of the outer row of bolts 103—103 is of such length that a suitable terminal lug 105 may be secured thereon between the nuts 104—104 (Fig. 6).

Each of the rotatable discs 81—81 has secured adjacent to its periphery, a plurality of bridging contacts 106—106 (Fig. 4) and a bridging contact 107 which is of sufficient width to engage two of the contact fingers 100—100 at a time. Each of the bridging contacts 106—106 and 107 is composed of a pair of resilient contact shoes 108—108 secured adjacent to the periphery of its respective disc 81 so that equal portions thereof extend beyond the periphery of the disc. The shoes 108—108 have spacers therebetween smaller than the thickness of the contact fingers 100—100 (Fig. 6) and as the contact fingers 100—100 engage the shoes 108—108 the shoes are forced slightly apart, whereby pressure is exerted upon the contacts by the shoes.

The contacts 106—106 are equally spaced around half of the periphery of the discs 81—81, whereas the contact 107 is positioned on the other half of the periphery of the discs somewhat closer to the lowermost contact 106 than to the uppermost contact 106, as seen in Fig. 4. This arrangement of the contacts 106—106 and 107 allows the contact 107 to engage the first two contacts 100—100 of their adjacent quadrant group while the contacts 106—106 engage the second and third contacts 100—100 of their adjacent quadrant groups when counting the position of the individual contact fingers 100—100 in each of the four quadrants in a clockwise direction.

In order to properly orientate the cam 94 with the deck of rotatable discs 81—81, the discs 81—81 are positioned with respect to the deck of plates 60—60 as shown in Fig. 4, whereupon the cam 94 is positioned on the shaft 90 so that its lobe 95 is in engagement with the actuating arm of the microswitch 76, and the leading end of the lobe 99 is in engagement with the actuating arm of the microswitch 71 (Fig. 5). The cam 94 is pinned to the shaft 90 in this position, so that the bridging contacts 106—106 and 107 are substantially in engagement with the contact fingers 100—100 of their respective quadrant groups before any one of the lobes 95, 96, 97 and 98 of the cam 94 actually actuate the operating arms of the microswitches 70 or 76. Likewise, the microswitches 70 and 76 are deactuated before the bridging contacts 107 and 106—106 are removed from their respective contact fingers to a new position in their respective contact quadrant group. This feature serves to protect the switching mechanism 34 because the microswitches 70 and 76 control the application of a high potential to the switching mechanism 34 and thereby prevent the making or breaking of the high potential circuit by the switching mechanism while it is under load.

The manually operated isolating switch bank 32 is mounted as a unit on the inside of the switchboard 26, directly below the fault indicating lamp bank 31. The switch bank 32 comprises a pair of rectangular sheet steel wall plates 110 and 111 (Fig. 7), which are spaced apart and secured in a vertical parallel position by a plurality of top and bottom rod supports 112—112. A pair of non-conductive, rectangular plates 114 and 115 are horizontally secured to the wall plate 111 and maintained in a parallel relationship by a plurality of vertical tie rods 116—116. Assembled on the plates 110 and 111 and 114 and 115 are a plurality of switching units. A switching unit is provided for each cable to be tested, and since the apparatus is designed to test twelve cables simultaneously, there are provided twelve switching units in the bank 32 (Fig. 2). The switching units are identical in construction and operation and only one unit will be described in detail. The isolating switch units are described more in detail and claimed in my copending application. Serial No. 632,043, filed November 30, 1945.

Figure 8:
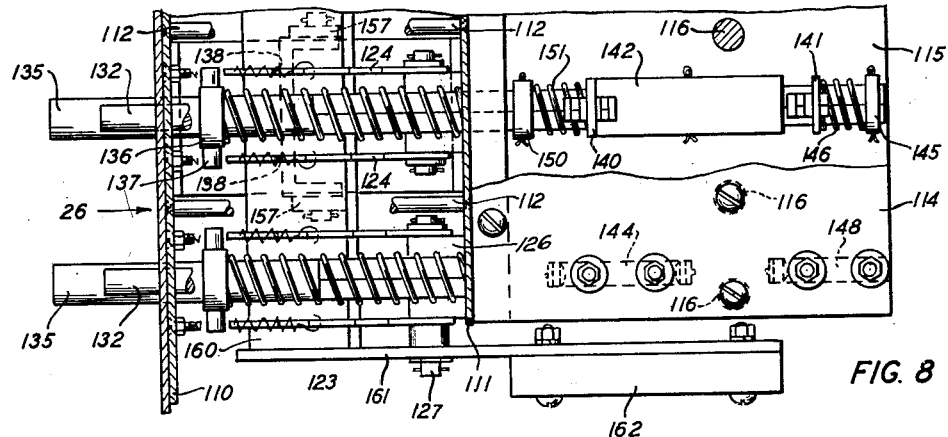
Fig. 8 is a fragmentary, top plan view of the apparatus shown in Fig. 7.
Figure 7:
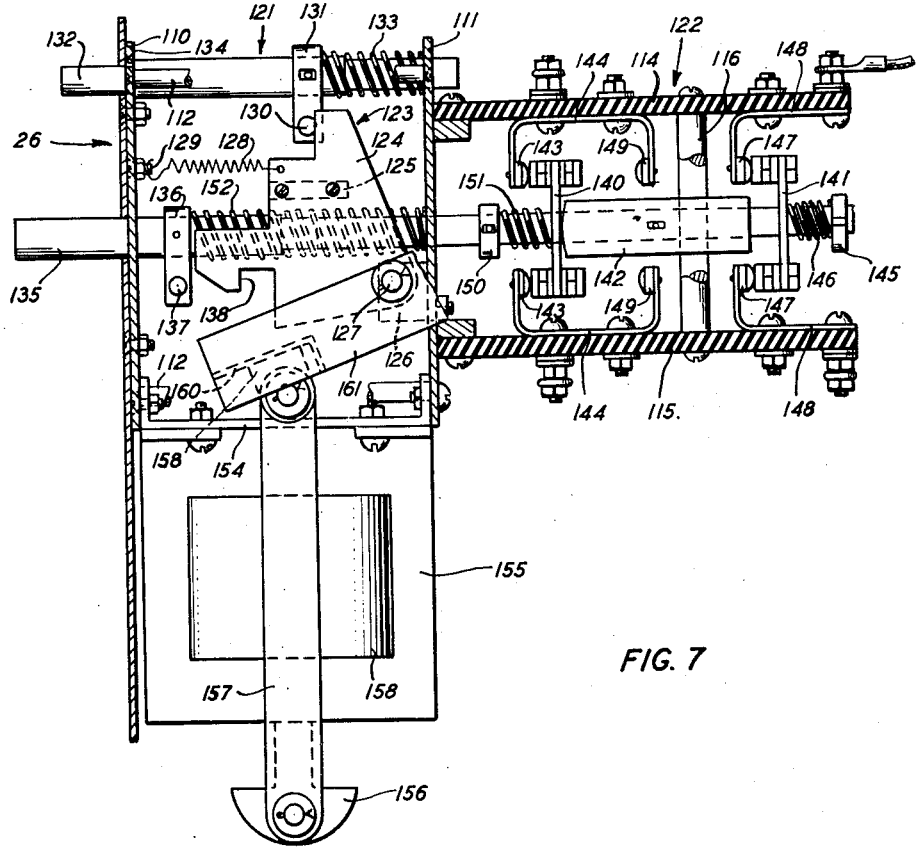
Fig. 7 is a fragmentary, vertical sectional view taken along line 7—7 of Fig. 1 and showing an isolating switch forming a part of the apparatus.

Each switching unit comprises a latching mechanism 121 mounted between the wall plates 110 and 111 and a contact making and breaking assembly 122 assembled between the plates 114 and 115. The latching mechanism 121 comprises a latch 123 composed of two identical, irregularly shaped, side plates 124—124 (Figs. 7 and 8). The plates 124—124 are spaced apart by means of a spacer 125 so as to fit neatly over the ends of a boss 126 secured on the plate 111, and are rotatably mounted on a pin 127 movably positioned in the boss 126. The latch 123 is biased against clockwise rotation by a pair of tension springs 128—128, each of which has one end thereof attached to one of the plates 124—124 and their other ends secured to one of a pair of studs 129—129 secured to the plate 110.

The latch 123 is maintained in substantially the position shown in Fig. 7 by means of a pin 130 secured to a collar 131 mounted on a push rod 132. The push rod 132 is slidably positioned in the wall plates 110 and 111 and has its outer end extending through the switchboard 26 (Fig. 1). A spring 133 is positioned over a portion of the push rod 132 between the collar 131 and the wall plate 111 and serves to urge the push rod 132 to the left until a shoulder 134 thereon abuts the plate 110. When lateral pressure is applied to the outer end of the push rod 132, the pin 130 serves to turn the latch 123 in a clockwise direction.

A push rod 135 is slidably positioned in the wall plates 110 and 111, with the free end thereof extending through the switchboard 26 and the inner end thereof extending midway between the plates 114 and 115. A collar 136 is secured on the push rod 135 adjacent to the wall plate 110 and has secured thereon a pin 137 which serves to engage a pair of notches 138—138 provided in the latch 123. The portion of the push rod 135 which extends between the plates 114 and 115 carries a slidably mounted contact arm 140 and another slidably mounted contact arm 141. Positioned on the push rod 135 between the contact arms 140 and 141 is an elongated collar 142 which serves to maintain the contact arm 140 normally in engagement with a left hand pair of contacts 143—143 positioned on a pair of U-shaped contact supports 144—144 secured to the plates 114 and 115. A collar 145 mounted on the right hand extremity of the push rod 135 and a spring 146 positioned adjacent thereto serve to maintain the contact arm 141 normally in engagement with a pair of contacts 147—147 positioned on a pair of L-shaped contacting members 148—148 mounted on the plates 114 and 115. A collar 150, positioned on the push rod 135 intermediate the wall plate 111 and the collar 142, and a spring 151, positioned on the push rod 135 adjacent to the collar 150, serve to maintain the contact arm 140 against the left end of the collar 142. A spring 152 positioned on the push rod 135 between the collar 136 and the wall plate 111 serves to urge the push rod to the left whereby the collar 142 maintains the contact arm 140 against the contacts 143—143.

Secured to a channel 154 mounted at the bottom of the wall plates 110 and 111 is a solenoid 155 having its plunger 156 connected to the ends of a pair of connecting links 157—157. The opposite ends of the connecting links 157—157 are connected to a bracket 158 secured to a transverse tripping bar 160 (Fig. 8). The ends of the tripping bar 160 are secured to a pair of arms, of which one designated 161 is shown in Figs. 7 and 8. These arms are rotatably mounted on the pins 127—127 of the end switching units and each arm carries a counterweight, of which one designated 162 is shown in the drawings.

When the push rod 135 is manually urged to the right, the contact arm 140 is disengaged from the contacts 143—143 and subsequently the collar 142 abuts the contact arm 141 and disengages it from the contacts 147—147. As the push rod 135 continues to travel to the right, the contact arm 140 engages a pair of contacts 149—149 mounted on the U-shaped supports 144—144 and the pin 137 is seated in the notches 138—138 of the latch 123, whereupon the push rod 135 is latched in this depressed position.

The push rod 135 may be manually released from the latch 123 by actuation of the push rod 132 which serves to rotate the latch 123 until the pin 137 is freed from the notch 138, whereupon the spring 152 restores the switching unit to its normal operating position. The push rod 135 may be automatically released by means of the solenoid 155, whose operating coil 158 is energized by the microswitch 72 mounted on the plate 65. When the microswitch 72 is actuated by any one of the lobes 95, 96, 97 or 98 of the cam 94, the solenoid coil 158 is thereby energized and the plunger 156 is urged upwardly, which in turn causes the links 157—157 connected thereto to raise the tripping bar 160 thereby lifting the latch 123 so as to release the pin 137 from the notch 138. Since the tripping bar 160 extends the full length of the isolating switch bank 32, all the latched push rods 135 will be simultaneously released upon operation of the solenoid 155.

Referring now to the wiring diagrams, Fig. 9 is a diagrammatic representation of a portion of a high voltage circuit. In that circuit a source of commercial A. C. potential, preferably 440 v., is applied to a pair of terminals 170 and 171, located on the control panel 41 (Fig. 2). The terminals 170 and 171 are connected to the line sides of a pair of normally open contacting arms 172 and 173 of a magnetic contactor 174 also mounted on the control panel 41. The load sides of the contacting arms 172 and 173 are connected to a winding 175 of the voltage regulator (powerstat) 33 (Fig. 2), which serves to regulate the potential being applied to a primary winding 176 of the step-up transformer 40. The voltage regulator 33 is operated by a hand wheel 177 mounted externally on the test set 10, and serves to regulate the potential on the primary winding 176 and thereby provide the required test potential in the testing circuit.

The transformer 40 serves to supply a high potential across the secondary winding 178 thereof having one side connected by a conductor 180 to a current coil 181 of a current responsive relay 182 and thence to ground and the other side connected to one side of a plurality of resistors 183—183 connected in parallel and mounted in the resistor bank 35 (Fig. 2). A conventional multiplier box 187 is connected to the load side of the parallel resistors 183—183 and to an associated voltmeter 188 which is in turn connected to ground. The load side of the resistors 183—183 also is connected to a terminal 179 of a testing circuit indicated generally at 189, of which one such circuit is provided for each deck plate 60 of the switch 34. It is to be understood that each testing circuit 179 is connected to its respective deck of the switching mechanism 34 identically as shown in Fig. 9 and therefore only one of the circuits will be described in detail. The voltmeter 188 is connected to indicate the voltage being applied between ground and the terminal 179 of each testing circuit 189. The terminal 179 is connected to a tapped resistor 185, which in turn, is connected to a terminal 186 provided on each deck plate 60 of the rotary switching mechanism 34.

A conductor 190, the contact arm 141 of the isolating switch unit and a conductor 191 serve to conduct the high potential shown on the voltmeter 188 directly to each switch plate 60 at a terminal 192. A tap 193 on each of the tapped resistors 185—185 is connected to one side of a neon lamp 194 mounted in the indicating lamp bank 31, the other side of which is connected to a junction point 195, whereby that portion of each resistor 185 between the tap 193 and the junction 195 is bridged across an associated neon lamp 194. When sufficient current is passing through the resistor 185, the voltage drop across the bridged portion thereof, will be sufficient to cause the neon lamp 194 to glow. The portion of the testing circuit embodying the current indicating means comprising the neon lamp bridged across the series resistance is described more in detail and claimed in copending application Serial No. 632,034, filed November 30, 1945, by H. J. Vennes (now abandoned).

Each of the deck plates 60—60 has its contact fingers 100—100 of the quadrant groups A, B, C and D wired to a plurality of terminals at the top of each plate in the following manner. The first contact 100 of the quadrant groups A, B, C and D are wired together and to the testing circuit terminal 186. The second and fifth contacts 100—100 of the quadrant group A are wired together and to a terminal 200. Likewise, the second and fifth contacts 100—100 of quadrant groups B, C and D are wired to terminals 201, 202 and 203, respectively. The third and sixth contacts 100—100 of quadrant groups A, B, C and D are wired together and to a terminal 204 which in turn is grounded. The fourth contact 100 of each of quadrant groups A, B, C and D is wired to the testing circuit terminal 192.

The terminals 200, 201, 202 and 203 are wired to the contacting clips 15—15 marked A, B, C and D, respectively, positioned at the terminal stations 13—13 (Fig. 1) to which are connected the individual conductors of the four-conductor cables 16—16. Hereinafter the four conductors of each of the cables 16—16 connected to the terminal clips 15—15 marked "A," "B," "C" and "D" are referred to as conductors A, B, C, and D, respectively. A steel wire braid 22 of the cables 16—16 is engaged by the grounding clips 14—14 situated adjacent to the terminal stations 13—13 to which the conductors are connected.

Connected to each of the contacting clips 15—15 marked "A," "B," "C" and "D" is a resistor 210, which is in series with one of a plurality of neon lamps 211—211 mounted in the continuity indicating lamp bank 25, the other side of which resistor is connected to a common ground. Each of the neon lamps 211—211 serve to indicate that potential is being applied by the testing circuit 189 to each of the contacting clips 15—15 mounted on the terminal stations 13—13 positioned on the conduit 12.

The potential supplied by the testing circuit 189 between ground and the terminal 186 and including the series resistors 184 and 185 shall hereinafter be designated as the "locate" potential, whereas the potential supplied by the testing circuit between ground and the terminal 192 shall be hereinafter designated as the "test" potential. Locate potential is applied to the first contact fingers 100—100 of each of the quadrant groups A, B, C and D, whereas test potential is applied to the fourth contact fingers 100—100 of each of the quadrant groups A, B, C and D. Quadrant groups A, B, C and D serve to apply locate voltage or test voltage, or to ground the individual conductors A, B, C and D of the cables 16—16, as the bridging contacts 106—106 and 107 assume their successive positions in the four quadrant groups A, B, C or D. The contact 107 of each disc 81 serves to apply locate potential or test potential to each of the conductors A, B, C and D of cables 16—16 as they are selectively positioned in each quadrant group of contact fingers 100—100, while the bridging contacts 106—106 serve to ground the conductors A, B, C and D, which are not connected to either locate or test potential.

Referring particularly to the control circuit shown in Figs. 9 and 10, a reset coil 215 of the current responsive relay 182 is connected to the power supply applied at the terminals 170 and 171 by a conductor 216, a normally open contact 217 of a reset push button 218, a conductor 220 and a conductor 221. A "power on" indicating lamp 222 is connected to the conductors 216 and 221 at the junctions 223 and 224, respectively, whereby the indicating lamp 222 is connected across the terminals 170 and 171. A stepdown transformer 230 (Fig. 9) has its primary winding 231 connected across the junction points 223 and 224 and is thereby energized by the supply potential. Its secondary winding 232 supplies a control potential across the control busses 233 and 234 (Figs. 9 and 10).

An interlock relay 240 has one side of its coil 241 connected to a junction 242 on the control bus 233 and its other side connected to a normally closed contact 243 of a control relay 244, which in turn is connected to a junction 245 on the bus 234. The control relay 244 has one side of its coil 246 connected to a junction 247 on the bus 233 and its other side connected to a normally open contact 249 of a control relay 250 which is connected to the junction 245 on the bus 234. A time delay relay 251 has one side of its operating coil 252 connected to a junction 253 on the bus 234 and the other side thereof connected to a normally open contact 254 provided on the current responsive relay 182, which in turn is connected to the bus 233 at a junction 255. The operating coil 153 of the solenoid 155 is connected across the control busses 233 and 234 at junctions 256 and 257, respectively, and has in series therewith the microswitch 72 which is mounted on the plate 65 and successively operated by the lobes 95, 96, 97 and 98 of the cam 94 (Fig. 5).

A "locate" indicating lamp 260 is connected in series with the microswitch 76 (Fig. 5) to the control busses 233 and 234 at junctions 261 and 262, respectively. A junction point 263 between the lamp 260 and the microswitch 76 is connected to a normally closed contact 264 provided on the relay 244 which is in turn connected to a normally open contact of a "locate" push button 265. The contact of the push button 265 is in turn connected to a junction point 266 and thence to a normally open contact 267, the other side of which is connected to a point 268 on the bus 234. The junction point 266 is connected also to one side of an operating coil 270 of the magnetic contactor 174. The other side of the coil 270 is connected to normally open contact 271 provided on the relay 240, which in turn is connected to a normally closed clutch contact 272 provided on a testing timer 273. The clutch contact 272 is connected to a normally closed motor operated contact 274 of the timer 273, which in turn is connected to one side of a coil 275 provided on the relay 250, the other side of which is connected to a junction point 276.

The junction point 276 is connected to a normally open contact 277 provided on the relay 250 which in turn is connected to the junction 245 on the bus 234. The junction 276 is also connected to a motor 278 of the timer 273 which in turn is connected to a junction 280 between the motor contact 274 and the coil 275. The junction 276 also is connected to the bus 233 at a junction 281 through a normally open contact 282 of a "test" push button 283, a normally closed contact 284 on the "reset" button 217, the contact 140 of the isolating switch 120, a normally open contact 285 on the relay 240, a junction point 286 and a "test" indicating lamp 287. The junction point 286 is connected to the microswitch 70 mounted on plate 65 (Fig. 5) which in turn is connected to a junction point 290, whereby a circuit from the junction point 281 on the bus 233 is completed through the normally closed contact 243 to the junction 245 on the bus 234.

The junction point 245 is connected to a normally open contact 292 provided on the relay 244, which in turn is connected to one side of a clutch coil 293, the other side of which is connected to a junction point 294 common to the contacts 272 and 274 of the timer 273. A second normally open contact 295 on the test push button 283 is connected in parallel with the contact 292 of the relay 244.

A "time" indicating lamp 296 is connected in series with a normally open contact 297 from a junction 298 to a junction 300 on the bus 234. A junction 301 on the bus 233 is connected to a normally closed contact 302 on the relay 132, which in turn is connected to the junction 294. A normally closed contact 303 on the relay 251 is connected in parallel with the normally closed contact 302. A junction 304 between the contact 254 and the coil 252 is connected to a "breakdown" indicating lamp 305 which in turn is connected to the bus 234 at a junction 306.

A primary winding 310 of a step down transformer 311 is connected across the control busses 233 and 234 at the junctions 312 and 313, respectively. The step-down transformer 311 serves to supply a low potential to an indicating lamp circuit 314, in which one side of its secondary winding 315 is commonly connected across a plurality of indicating lamps mounted on the switchboard 26 directly above the wheel 43 and marked "A," "B," "C" and "D" which correspond to the positions at the terminal stations 13—13 marked "A," "B," "C" and "D." The other side of the winding 315 is commonly connected to a plurality of microswitches 71, 73, 74 and 75, which in turn are connected to the other side of the lamps A, B, C and D, respectively. The microswitches 71, 73, 74 and 75 are mounted on the plate 65 (Fig. 5) and are actuated by the lobe 99 of the cam 94, and serve to indicate which conductors A, B, C and D of the cable 16 are connected to "locate" or "test" potential.

Operation

The above-described test set operates in the following manner to test the insulation of the individual conductors of a plurality of four-conductor electric cables.

A plurality of coils of the cables 16—16 to be tested are suspended adjacent to the high voltage terminal bus 11 and opposite their respective terminal stations 13—13. One end of each cable 16 is prepared so that the steel wire braid 21 of the cable contacts the grounding clips 14—14 and the ends of the individual conductors are inserted in the contacting clips 15—15, marked "A," "B," "C" and "D." A source of potential is applied to the test unit 10 at the terminals 170 and 171 (Fig. 9), whereupon the green pilot lamp 222 having the adjacent indicia "Power on," is lighted to indicate that the apparatus is energized. An operator, positioned directly in front of the switchboard 26 performs the insulation test in two steps, namely, a preliminary step wherein a locate potential is applied to the individual conductors to ascertain which conductors have defective insulation, and a final step where a test potential is applied to the individual conductors for a predetermined period of time.

Each of the cables 16—16 to be tested is connected to terminals on one of the stationary plates 60—60 and a contact carrying disc 61 is provided for each of the stationary plates. Hence, although only one plate 60 and one disc 61 of the rotary switching mechanism 34 are shown in the wiring diagram, it will be understood that when the operation of that portion of the rotary switching mechanism 34 shown in the wiring diagram is described the same operation will be performed simultaneously by all the other like portions of the switching mechanism and all the cables will be tested simultaneously in the same manner.

Applying locate potential

Referring now to Fig. 9, the operator revolves the hand-wheel 43 in a clockwise direction until each of the contacts 107 bridges the first two contact fingers 100—100 of its respective quadrant group A (Figs. 4 and 8), whereupon the cam 94 is positioned, as shown in Fig. 5. The lobes 95 and 99 of the cam 94 actuate the microswitches 76 and 71, respectively, whereupon the pilot lamp 260, marked "locate," is lighted indicating that the rotary switching mechanism 34 is now in position to apply a locate potential to the testing circuit, and the switchboard lamp marked "A" is lighted indicating that all of the conductors connected to the contacting clips 15—15 marked "A" are now connected in the locate testing circuits. The bridging contacts 106—106 of the rotary switch 34 bridge the second and third contact fingers 100—100 of the B, C and D quadrant groups and thereby serve to ground the conductors connected to the contacting clips 15—15 marked "B," "C" and "D."

The operator now closes the locate push button 265 (Figs. 1 and 10) which serves to energize the operating coil 270 of the magnetic contactor 174. The magnetic contactor 174 is connected across the control busses 233 and 234 at the junctions 301 and 262, respectively, by means of a circuit starting at the junction 262 and including the microswitch 76 closed by the lobe 95 of the cam 94, the contact 264, the locate push button 265, the magnet coil 270, the contact 271 which was closed by energization of the relay 240 when potential was applied to the terminals 170 and 171, the timer clutch contact 272, and the contact 302 on the current responsive relay 182, which in turn is connected to the junction 301. Upon the energization of the magnetic contactor 174, its contacts 172 and 173 are closed whereby potential is applied to the voltage regulator 33 and thence to the transformer 40. The voltage regulator 33 is adjusted by the operator by means of the hand wheel 177 to obtain a predetermined voltage reading on the voltmeter 188, which voltage is applied by means of the locate test circuit to all the A conductors.

One side of each of the locate test circuit is completed through the parallel bank of current limiting resistors 183—183, and the series resistors 184 and 185 to the first contact finger 100 of the quadrant group A, through the bridging contact 107 to the second contact finger 100 of the same quadrant group and through said second contact finger 100 to its respective clip 15 marked "A." The conductors connected to the clips 15—15 marked "B," "C" and "D" are grounded by means of the contacts 106—106 which are bridging the second and third contact fingers 100—100 of the B, C and D quadrant groups, said third contact fingers 100—100 of each of said groups being connected to ground. The other side of the locate test circuit is connected to the current coil of the current relay, which in turn is connected to ground. While the locate voltage is being applied to all the A conductors, the pilot lamps 211—211 connected thereto are lighted, thereby indicating that the test unit 10 is applying locate potential to all the clips 15—15 marked "A" (Fig. 1).

The testing apparatus now is impressing a locate potential across all the A conductors and their respective insulating coverings 20—20. If the insulating coverings 20—20 are not defective they will withstand the locate potential and only a small leakage current will flow in the test circuit and the series resistors 184 and 185 connected therein. This small current flow will not produce a voltage drop across those portions of the resistors 185—185 bridged by the neon lamps 194—194 sufficient to cause the neon lamps to glow.

If the insulating coverings 20—20 on one or more of the A conductors are defective, the locate potential will break down all the defective insulating coverings and cause current to flow through the faults and their associated branches of the testing circuits. This current flowing through the resistor 185 connected in series with each of the conductors produces a sufficient voltage drop across the portion of the resistors bridged across its respective neon lamp 194 to cause each neon lamp to glow and thereby indicate to the operator which conductors have defective insulating coverings thereon. Since the neon lamps 194—194 are numbered from 1 to 12, inclusive (Fig. 1), corresponding to like numbers for the terminal stations 13—13 on the terminal bus 11, the operator may readily note which of the terminal station 13—13 have defective A conductors connected thereto. However, due to the resistors 184 and 185, the current flowing in the testing circuit 189 is not of sufficient magnitude to operate the current responsive relay 182, nor is the current flowing through each individual insulation fault sufficient to char the insulation at the fault so that it may be subsequently detected by visual inspection. Having duly noted the respective positions of all the defective conductors, on the terminal bus 11, the operator now releases the locate push button and thereby deenergizes the transformer 40 of the test unit 10.

*Applying test potential*

The operator again revolves the hand wheel 43 connected to the rotary switching mechanism 43, in a clockwise direction until the pilot lamp 287 marked "test" is lighted, which indicates that the contacts 106—106 and 107 have moved to the broken-line positions (Fig. 9) and the lobe 95 now actuates the microswitch 70. The lobe 96 remains in engagement with the microswitch 71 to indicate that all the A conductors are still under test. Assuming that during the "locate" test only one of the A conductors proved defective, the operator now depresses the test push button 283 to close its two normally open contacts 282 and 295. The contact 282 serves to energize the coil 275 of the relay 250 and the motor 278 of the timer 273, whereas the contact 295 serves to energize the clutch coil 293 of said timer. The relay 250 closes its normally open contacts 249, 267 and 291. The contact 267 serves to energize the coil 246 of the relay 244 and close its normally open contacts 298 and 297 and to open its normally closed contacts 243 and 264. The contact 267 of the relay 250 serves to energize the coil 270 of the magnetic contactor 174, whereby the transformer 40 is again energized. The contact 277 of the relay 250 serves to maintain potential on the coil 275 and hold the contacts closed should the test push button 283 be inadvertently released. The pilot lamp 296 marked "time" is lighted to indicate that the timer 273 has started its timing cycle. The relay 240, which was closed before the test push button 283 was depressed, is maintained closed by the contact 291 of relay 250, and its contact 277 connected in series with the contact 267 of said relay 250 completes the coil circuit of magnetic contactor 174.

The transformer 40 now applies test potential to all the A conductors by means of their associated test circuit 189 which by-passes the series resistors 184 and 185 and the associated neon lamps 194—194 by virtue of the position of the switching mechanism 34. In some cases the type of fault in the defective insulating covering 20 of the A conductor indicated by the application of locate potential is such that upon the application of test potential it will burn out and clear itself, whereupon the test potential is applied to all the A conductors for a predetermined period of time controlled by the timer 273. However, if the fault in the defective insulating covering 20 does not clear itself, the test potential will break down the fault and cause a high current to flow therethrough which burns-in the fault and chars the insulating covering 20 so that it may be readily detected upon visual inspection. This high current is of sufficient magnitude to cause the current responsive relay 182 to operate and close its normally open contact 254 and open its normally closed contact 302.

The contact 254 serves to energize the coil 252 of the time delay relay 251, whose contact 303 parallels the disengaged contact 302 and maintains the test circuit closed for a short period of time. The high current continues to flow through the fault in the insulation until the time delay relay 251 completes its timing cycle of several seconds, whereupon it disengages its contact 303 and thereby deenergizes the test unit 10 by dropping out the relay 250, the relays 240 and 244, and the magnetic contactor 174. Also, the instant that the high current causes the current responsive relay 182 to operate, the pilot lamp 305 marked "breakdown" is lighted indicating to the operator that the fault has not cleared itself and was being burned-in for the predetermined period of time controlled by the time delay relay 251. The deenergization of the magnetic contactor 174 disconnects the transformer 40 from the power supply and thereby deenergizes the high potential testing circuit connected to all the A conductors.

The operator now isolates the defective A conductor from the testing circuit by depressing the push rod 135 of the isolating switch unit positioned directly beneath that neon lamp 194 of the bank 31 which indicated the fault during the locate test. The unit that is so operated disengages its contact arm 141 from its contacts 147—147, and thereby disconnects the testing circuit from the particular switch deck of the decks 60—60 which supplies test potential to the defective A conductor.

The operator now presses the reset button 218 to close its contact 217 which serves to energize the reset coil 215 of the current responsive relay 182 and thereby disengages its contact 254 and re-engages its contact 302. The control circuit is now restored to its normal operating condition, whereupon the operator again depresses the test button 283, which again energizes the control relays 244, 250 and 285 and the magnetic contactor 182. Test voltage is applied to the remaining non-defective A conductors connected to the clips 15—15 for a predetermined period of time controlled by the timer 273. When the timer 273 completes its timing cycle, it disengages its contacts 272 and 274 and thereby opens the holding circuit of the control relays and deenergizes the high potential testing circuit.

The "test" button 283 must be depressed for the entire testing period until the pilot light marked "time" is darkened. However, should the operator inadvertently release the "test" button 283 during the timing cycle, the high potential testing circuit 189 would be deenergized but the timer 273 would continue to run until it had completed its cycle, and the high potential testing circuit cannot thereafter be reenergized until the timer 273 has completed its full timing cycle. This feature serves to prevent the operator from reducing the period of time the conductors under test are subjected to the "test" potential.

If more than one A conductor proved to be defective during the "locate" test, the fault in each of the insulating coverings 20—20 must be burned-in individually as described above. For example, assume that during the locate test defective insulating coverings 20—20 were indicated at the terminal stations 13—13 numbered 2, 4 and 5 by the neon lamps 194—194 numbered 2, 4 and 5. The operator must isolate the terminal stations 13—13 numbered 4 and 5 by means of the isolating switch units numbered 4 and 5, and then apply test potential to the remaining A conductors whereby the insulation fault in covering 20 of the A conductor connected to the number 2 terminal station will either clear itself or be burned-in as described above. Upon completion of the burn-in operation on the conductor at station 2, the operator must reset the current responsive relay, isolate the conductor at the number 2 station by means of the number 2 isolating switch, and reconnect the station number 4 to the testing circuit by pressing the release push rod 132 of the number 4 isolating switch. The "test" voltage is again applied to the A conductors under test whereupon the insulation fault of the A conductor connected to the clip 15 at the number 4 terminal station 13 is burned in. The above procedure is repeated in order to burn-in the insulation fault in the A conductor connected to the clip 15 at the number 5 terminal station.

After completing the insulation test upon the nondefective A conductors connected to terminal clips 15—15 marked "A," the operator revolves the hand wheel 43 until the switchboard light marked "B" and the pilot lamp 260 marked "locate" are lighted. The contact 107 of the rotary switch 34 now bridges the first and second contact fingers 100—100 of all the quadrant groups B of the plates 60—60. The contacts 106—106 now ground the conductors connected to the clips 15—15 marked "A," "C" and "D" in a manner similar to that already described. The lobe 99 of the cam 94 now engages the microswitch 73, which energizes the pilot lamp marked "B," whereas the lobe 96 now engages the microswitch 76 which energizes the "locate" pilot lamp 260.

As the cam 94 was rotated from its previous "test" position to this present "locate" position, the lobe 95 thereon momentarily engages the microswitch 72 which in turn serves to energize the coil 158 of the solenoid 155 whereby all of the isolating switch units which were depressed by the operator during the test on the A conductors are released by the tripping action of the solenoid 155.

"Locate" and "test" voltage is applied to the B conductors and any insulation faults thereon are burned-in and the defective conductors isolated as described in the tests on the A conductors. The same tests are conducted on the C and D conductors whereupon the cables 16—16 are disconnected from the terminal bus 11 and are replaced by another group of similar cables to be tested for insulation defects.

While the above-described apparatus is particularly well adapted to conduct an insulation test on twelve four-conductor cables simultaneously, it is to be understood that the apparatus may be modified so as to conduct insulation tests on different types and quantities of cables without departing from the invention as defined in the appended claims.

What is claimed is:

1. An apparatus for electrically testing insulated conductors of multi-conductor cables wherein each conductor consists of a filamentary conducting core surrounded by an insulating covering, which comprises a testing circuit having two output terminals, means for connecting one terminal of the testing circuit to ground, switching means for simultaneously connecting the core of one conductor of each cable to be tested in parallel to the other terminal of the testing circuit while connecting the remaining conductors of each cable to ground, means for selectively connecting the testing circuit to a source of potential to impress across the core and the insulating covering of each conductor a potential having an intensity sufficient to break down the insulating coverings at faults of low dielectric strength therein, switching means for selectively disconnecting the conductors whose insulating coverings have faults of low dielectric strength from the testing circuit, and timing means energized upon the actuation of the potential connecting means for maintaining the application of potential across the insulating coverings of the non-defective conductors for a predetermined period of time.

2. An apparatus for electrically testing insulated conductors of multi-conductor cables wherein each conductor consists of a filamentary conducting core surrounded by an insulating covering, which comprises a testing circuit having two output terminals, means for connecting one terminal thereof to ground, switching means for simultaneously connecting the core of one conductor of each cable in parallel to the other terminal of the testing circuit while connecting the cores of the remaining conductors of each cable to ground, means for selectively connecting the testing circuit to a source of potential so as to impress a potential across the core and the insulating covering of the conductor connected to the testing circuit having an intensity sufficient to break down its insulating covering at faults of low dielectric strength therein, means for disconnecting the cores whose insulating coverings have faults of low dielectric strength from the testing circuit, timing means energized upon the connection of the testing circuit to the potential source for maintaining potential across testing circuit for a predetermined period of time, and means operated by the timing means for preventing the operation of testing circuit connecting means during the timing period should the testing circuit be inadvertently disconnected from the potential source during the testing operation on the conductors.

3. An apparatus for electrically testing insulated conductors of multi-conductor cables wherein each conductor consists of a filamentary conducting core surrounded by an insulating covering, which comprises a testing circuit having one terminal grounded and the other terminal thereof connected to a test potential terminal and a locate potential terminal, means for selectively connecting the testing circuit to a potential source to impress a potential across the respective terminals of the testing circuit, switching means for simultaneously connecting the core of one of the conductors of each cable to be tested in parallel to the locate potential terminal of the testing circuit while connecting the cores of the remaining conductors of each cable to ground whereby locate potential is impressed across the said conductor core and its surrounding insulating covering, said locate potential having an intensity sufficient to break down any faults of low dielectric strength in the conductor insulation and cause a current to flow in the testing circuit, means responsive to said breakdown current for indicating which of the conductors connected in the testing circuit have faults in their insulating covering which break down upon the application of the locate potential, means for disconnecting conductors having defective insulation from the switching means, and means provided on the switching means for simultaneously connecting the conductors in parallel to the test potential terminal of the testing circuit to impress a potential across the core and insulating covering of each of the non-defective conductors.

4. An apparatus for electrically testing insulated conductors of multi-conductor cables wherein each conductor consists of a filamentary conducting core surrounded by an insulating covering, which comprises a testing circuit including a series resistance connected in one side thereof and having the other side thereof grounded, switching means for selectively connecting the core of one conductor of a plurality of cables to be tested in parallel to the load side of the series resistance connected in the testing circuit while connecting the core of the remaining conductors of each cable to ground, means for connecting the test circuit to a source of potential whereby a potential is impressed across the insulating covering and core of each conductor having an intensity determined by said series resistance sufficient to break down the insulation at faults of low dielectric strength and cause a current to flow through such faults and the associated testing circuit to ground, means responsive only to the breakdown current for indicating which conductors connected to the testing circuit have defective insulating coverings, means for disconnecting each of the conductors having defective insulating coverings from the switching means, and means provided on the switching means for simultaneously connecting the non-defective conductors in parallel to the testing circuit so as to shunt out the series resistance of the testing circuit, whereby a substantially higher potential is impressed across said non-defective conductors connected in the testing circuit by the last-mentioned switching means.

5. An apparatus for electrically testing insulated conductors of multi-conductor cables wherein each conductor consists of filamentary conducting core surrounded by an insulating covering, comprising a testing circuit including a series resistance connected in one side thereof and having the other side thereof grounded, switching means for simultaneously connecting the core of one conductor of a plurality of cables to be tested in parallel to the load side of the series resistance connected in the testing circuit while connecting the core of the remaining conductors of each cable to ground, means for selectively connecting the testing circuit to a source of potential whereby a potential is impressed across the core and the insulating covering of each conductor having an intensity determined by the series resistance sufficient to break down the insulating covering at faults of low dielectric strength and cause a current to flow through such faults and the associated testing circuit to ground, means responsive only to the breakdown current flowing in the testing circuit for indicating which conductors connected therein have defective insulating coverings, means for disconnecting each of the conductors having defective insulating coverings from the switching means, means provided on the switching means for connecting the core of the non-defective conductors to the testing circuit so as to shunt out the series resistance of the testing circuit whereby a higher potential is impressed across the core and insulating covering of said non-defective conductors connected therein, timing means energizable with the last-mentioned testing circuit for continuing the high potential test a predetermined period of time, and means energized by the timing means for preventing the operation of the testing circuit connecting means during the timing period should the testing circuit be inadvertently disconnected from the potential source during the testing operation.

6. An electrical testing apparatus for simultaneously testing the insulating coverings of the individually insulated conductors on a plurality of cables, which comprises a testing circuit having one output terminal thereof grounded, a transformer energizable to impress a test potential across the ground terminal and a second output terminal of the testing circuit, a resistance connected in series with one side of the testing circuit to reduce the test potential to a locate potential of substantially lower value across the ground and a third output terminal of the testing circuit, multi-deck switching means for simultaneously connecting one conductor of a plurality of cables in parallel to the locate potential terminal of the testing circuit while connecting the remaining conductors of each cable to ground, means for indicating which conductors are connected to the locate potential testing circuit, means for selectively energizing the transformer to apply a potential across the insulating coverings of the conductors connected to the third output terminal of the testing circuit having an intensity sufficient to breakdown faults of low dielectric strength in the coverings and cause a current to flow in the locate testing circuit, means responsive to the current flowing in the locate testing circuit for indicating that locate potential is applied to all the conductors connected in the locate potential testing circuit, means provided in the locate testing circuit for indicating which of the insulating coverings of the conductors have faults of low dielectric strength which breakdown under the application of the locate potential, means provided on the switching means for simultaneously connecting the said conductors in parallel to the test potential terminal of the testing circuit while maintaining the remaining conductors grounded, means for effecting a second energization of the testing circuit whereby a potential is applied across the insulating covering and its conductor having an intensity sufficient to cause a current to flow in the testing circuit which will burn-out or permanently burn-in the faults in the insulation, means responsive to the breakdown current flowing in the test potential testing circuit for deenergizing the transformer when a breakdown occurs in the insulating covering of one of the conductors, time delay means energized upon the energization of the current responsive means for maintaining the transformer energized so that the breakdown current flows through the insulation fault a predetermined period of time after a breakdown occurs, means for disconnecting the conductors having defective insulation from the switching means, and means for resetting the current responsive means so that the testing circuit may be reenergized and test potential applied to the non-defective conductors connected in the test potential testing circuit.

7. An apparatus for testing the insulating coverings surrounding the individually insulated conductors of multi-conductor electric cables, comprising a transformer energizable to impress a potential across the output terminals thereof one of which is connected to ground, a low potential control circuit for energizing the primary winding of the transformer, a test potential testing circuit connected directly to the ungrounded terminal of the transformer, a locate potential testing circuit including a series resistance also connected to the ungrounded terminal of the transformer, rotatable switching means for selectively connecting one conductor of a plurality of cables in parallel to the ungrounded side of the locate potential testing circuit while connecting the remaining conductors of each cable to ground, manually operable means for controlling the continuity of the control circuit to energize the transformer and impress a locate potential across all the insulating coverings of the conductors connected thereto by the switching means, said locate potential having an intensity sufficient to break down any faults of low dielectric strength in the insulating coverings of the conductors and cause a current to flow from the conductor through the fault to ground, means responsive to said current flow in the testing circuit for indicating which conductors have such faults in their insulating coverings, means included in the switching means for connecting the said conductors in parallel to the test potential testing circuit, a second manually operable means associated with the control circuit for energizing the transformer to impress a test potential across the insulating coverings of the conductors connected therein having an intensity sufficient to burn-out or permanently burn-in any insulation faults previously indicated by the locate potential test, means for sequentially opening the control circuit to deenergize the transformer and then disconnecting each conductor having a fault in its insulating covering from the switching means, means provided on the disconnecting means for reclosing the control circuit so that the transformer may be reenergized to apply test potential across the insulating coverings of the non-defective conductors connected in the test potential testing circuit, timing means energized by said second manually operable means for maintaining the transformer energized for a predetermined period of time, means operated by the timing means for preventing the reenergization of the transformer during the timing period should the second manually operable means be inadvertently released during the timing period, and means included in the switching means for grounding the previously tested conductors and connecting another conductor of each cable in parallel to the testing circuit, whereby each conductor of the cable may be successively subjected to the locate and test potential testing circuits.

8. The method of electrically testing insulated conductors of multi-conductor cables wherein each conductor consists of a filamentary conducting core surrounded by an insulating covering, which comprises simultaneously applying across one of the cores and its insulating covering of a plurality of cables being tested a potential having an intensity sufficient to break down points of low dielectric strength in the insulating covering, removing the potential from the conductors having such faults in their insulating coverings, and applying a substantially higher potential across the core and insulating coverings of the conductors having non-defective insulating coverings for a predetermined period of time.

9. The method of electrically testing a plurality of electric cables each of which includes a plurality of conductors each having a filamentary core surrounded by an insulating covering, which comprises simultaneously impressing across one of the cores and its insulating covering of a plurality of cables being tested a potential having an intensity sufficient to determine which conductors have faults of low dielectric strength in the insulating coverings thereof, impressing across the core and insulating covering of each conductor a potential having an intensity sufficient to break down the insulation at such faults and cause a current to flow through the faults, causing the latter current flow to interrupt the application of the last-mentioned potential a predetermined period of time after the breakdown of the fault in the insulating covering occurs, said predetermined period of time serving to permit the latter breakdown current to burn in the fault so that it may be readily detected by visual inspection, removing the last-mentioned potential from the cores having defective insulating coverings, and applying the last-mentioned potential across the non-defective insulating covering for a predetermined period of time.

10. The method of electrically testing the insulating coverings surrounding each individual conductor in a plurality of multi-conductor cables, which comprises simultaneously applying across one conductor of each cable and the remaining conductors of each cable a potential having an intensity sufficient to cause a current to leak through any faults of low dielectric strength in the insulating coverings of the conductors to determine which of the conductors have such faults in their respective insulating coverings, applying a potential across the said conductors and the remaining conductors of each cable having an intensity sufficient to break down any previously determined faults and cause a substantially higher current to flow through the fault, causing the last-mentioned current flowing through the faults to interrupt the application of the last-mentioned potential a predetermined period of time after the last-mentioned breakdown occurs, said period of time permitting the current flow through the fault to burn-in the faults in the insulating covering so that they may be readily detected by visual inspection, removing the last-mentioned potential from the conductors having defective insulating coverings, and applying the last-mentioned potential to the non-defective insulating coverings for a predetermined period of time to determine their dielectric strength.

11. The method of electrically testing the insulating coverings surrounding each individual conductor in a plurality of multi-conductor cables, which comprises simultaneously applying across one conductor of each cable to be tested and the remaining conductors of the respective cable a potential having an intensity sufficient to cause a current to leak through faults of low dielectric strength in the insulating coverings of the said conductors to determine which conductors have such faults in their respective insulating coverings, applying across all the non-defective insulating coverings and only one faulty insulating covering a potential having an intensity sufficient to break down the fault of reduced dielectric strength in the defective covering and cause a substantially greater current flow therethrough, causing the latter current flow through the fault to deenergize the testing circuit a predetermined time after the last-mentioned breakdown of the covering occurs so that the current will either burn-out the fault in the covering or permanently burn-in the fault in the covering so that it may be detected by visual inspection, repeating the last-mentioned potential test across each of the faulty insulating coverings individually with the remaining group of conductors having non-defective coverings, removing the last-mentioned potential from the conductors having faulty coverings whose faults have been permanently burned-in, reapplying the last-mentioned potential across the non-defective coverings of the conductors for a predetermined period of time, simultaneously removing the last-mentioned potential from the non-defective conductors, and repeating the above-stated potential testing steps in the order named between each of the untested conductors of the cables and remaining conductors of each cable.

WENTWORTH D. BOYNTON.

REFERENCES CITED

The following references are of record in the file of this patent:

UNITED STATES PATENTS

| Number | Name | Date |
|---|---|---|
| 1,886,682 | Hubbard | Nov. 8, 1932 |
| 1,950,484 | Clarvoe | Mar. 13, 1934 |
| 1,977,703 | Swartwout | Oct. 23, 1934 |
| 2,108,637 | Bartgis | Feb. 15, 1938 |
| 2,310,335 | Wolfson | Feb. 9, 1943 |
| 2,376,232 | Cummings | May 15, 1945 |
| 2,440,480 | Lewis | Apr. 27, 1948 |